(12) United States Patent
Smith et al.

(10) Patent No.: US 9,670,972 B2
(45) Date of Patent: Jun. 6, 2017

(54) TRIMMED LOCK-UP CLUTCH

(71) Applicant: Twin Disc, Inc., Racine, WI (US)

(72) Inventors: William D. Smith, Rockford, IL (US); Richard A. Shaw, Wauwatosa, WI (US)

(73) Assignee: Twin Disc, Inc., Racine, WI (US)

( * ) Notice: Subject to any disclaimer, the term of this patent is extended or adjusted under 35 U.S.C. 154(b) by 170 days.

(21) Appl. No.: 14/263,545

(22) Filed: Apr. 28, 2014

(65) Prior Publication Data
US 2015/0308521 A1 Oct. 29, 2015

(51) Int. Cl.
| | |
|---|---|
| F16H 61/14 | (2006.01) |
| G06F 7/00 | (2006.01) |
| G06F 17/00 | (2006.01) |
| G06F 19/00 | (2011.01) |
| F16D 48/06 | (2006.01) |

(52) U.S. Cl.
CPC ...... *F16D 48/06* (2013.01); *F16D 2500/3024* (2013.01); *F16D 2500/30406* (2013.01); *F16D 2500/3163* (2013.01); *F16D 2500/3166* (2013.01); *F16D 2500/50293* (2013.01); *F16D 2500/7061* (2013.01); *F16D 2500/70406* (2013.01); *F16D 2500/70652* (2013.01)

(58) Field of Classification Search
CPC .................. F16H 2061/145; B60W 2710/025
See application file for complete search history.

(56) References Cited

U.S. PATENT DOCUMENTS

| | | | |
|---|---|---|---|
| 4,305,710 A | * | 12/1981 | Schneider .............. B63H 23/08 440/75 |
| 4,577,737 A | | 3/1986 | Niikura et al. |
| 4,640,395 A | | 2/1987 | Murasugi et al. |
| 4,706,790 A | * | 11/1987 | Lockhart ............... F16H 61/143 192/3.3 |
| 4,724,939 A | | 2/1988 | Lockhart et al. |
| 4,757,886 A | | 7/1988 | Brown et al. |
| 4,966,261 A | | 10/1990 | Kohno et al. |
| 5,029,087 A | | 7/1991 | Cowan et al. |
| 5,064,036 A | | 11/1991 | Schneider |
| 5,209,330 A | | 5/1993 | Macdonald |
| 5,337,867 A | | 8/1994 | Kirkwood |
| 5,386,896 A | | 2/1995 | Matsuoka |
| 5,403,250 A | | 4/1995 | Juergens |
| 5,477,950 A | | 12/1995 | Maloof |
| 5,566,802 A | | 10/1996 | Kirkwood |
| 5,667,043 A | | 9/1997 | Dehrmann et al. |
| 5,674,155 A | * | 10/1997 | Otto ....................... F16H 45/02 192/3.3 |
| 5,725,456 A | | 3/1998 | Fischer et al. |

(Continued)

*Primary Examiner* — Tisha Lewis
(74) *Attorney, Agent, or Firm* — Boyle Fredrickson S.C.

(57) ABSTRACT

In order to reduce torsional vibrations in a drive including a torque converter with a turbine and impeller, clutch slip speed of the drive is adjusted by manipulation of clutch pressure. This may be done in either closed loop mode or open loop mode by setting the clutch pressure to a predetermined value or continuously adjusting clutch pressure. Pressure is adjusted to produce a positively sloped function of sensed total torque of the clutch and turbine over the clutch slip speed. This produces extended service life of the drive train components, greater efficiency of the torque converter, and smoother operation of the drive.

32 Claims, 13 Drawing Sheets

(56) References Cited

U.S. PATENT DOCUMENTS

| | | |
|---|---|---|
| 5,752,894 A * | 5/1998 | Fischer ............... F16F 15/123 477/169 |
| 5,813,505 A | 9/1998 | Olsen et al. |
| 5,975,260 A | 11/1999 | Fisher et al. |
| 6,006,878 A | 12/1999 | Macdonald et al. |
| 6,024,674 A | 2/2000 | Sato et al. |
| 6,036,619 A | 3/2000 | Tashiro et al. |
| 6,056,092 A | 5/2000 | Hinkel |
| 6,056,093 A | 5/2000 | Hinkel |
| 6,070,704 A | 6/2000 | Sasse |
| 6,099,435 A | 8/2000 | Halene et al. |
| 6,264,581 B1 | 7/2001 | Tashiro et al. |
| 6,290,042 B1 | 9/2001 | Breier |
| 6,321,891 B1 | 11/2001 | Olsen et al. |
| 6,412,617 B1 | 7/2002 | Spijker et al. |
| 6,708,804 B2 | 3/2004 | Krause et al. |
| 6,827,187 B2 | 12/2004 | Sasse |
| 6,851,531 B2 | 2/2005 | Sasse |
| 7,286,922 B1 * | 10/2007 | Fischer ............... F16H 61/143 192/54.1 |
| 7,357,233 B2 | 4/2008 | Kos et al. |
| 7,748,474 B2 | 7/2010 | Watkins et al. |
| 8,033,370 B2 | 10/2011 | Degler |
| 8,214,188 B2 | 7/2012 | Bailey et al. |
| 8,256,562 B2 | 9/2012 | Robinette et al. |
| 8,291,700 B2 | 10/2012 | Kombowski et al. |
| 8,382,634 B2 | 2/2013 | Beck et al. |
| 8,489,297 B2 | 7/2013 | Kabrich |
| 2003/0098212 A1 | 5/2003 | Sasse et al. |
| 2009/0098978 A1 | 4/2009 | Lee et al. |
| 2009/0132135 A1 * | 5/2009 | Quinn, Jr. ........... F16H 61/6649 701/55 |
| 2010/0139977 A1 | 6/2010 | Watkins et al. |
| 2012/0053004 A1 | 3/2012 | Beck et al. |
| 2012/0305358 A1 | 12/2012 | Maienschein et al. |
| 2013/0151099 A1 | 6/2013 | Chae et al. |

* cited by examiner

TRIMMED LOCK-UP CLUTCH

BACKGROUND OF THE INVENTION

Field of the Invention

This invention relates to a system for controlling the slip of a clutch transferring rotational force from a power source to an output shaft, and more particularly, to controlling the clutch pressure and clutch slip speed to reduce torsional vibrations generated by the entire powertrain.

Background of the Invention

The torque converter clutch is a fluid operated friction device engageable to couple an input shaft to an output shaft via a clutch. Typically the clutch is either fully released to permit unrestrained slippage between the input shaft and the output shaft, or fully engaged, also referred to as "locked-up," to prevent such slippage entirely. An unfortunate aspect of full clutch engagement is that the engine and any subsequent moving parts produce torsional vibrations, normally absorbed by the torque converter, that are passed directly through the clutch to the remainder of the powertrain. Torsional vibrations are a product of the mass and geometry of the entire system. Output and input shaft length, firing order of the engine, mass of the rotating assembly, and related parts, all contribute to the overall mass and geometry. Due to this mass and geometry, the system has frequencies at which it will naturally resonate. These resonant frequencies produce torsional vibrations when the system is operated under certain loads. These torsional vibrations produce damaging pulsations therein if not properly dampened that can significantly reduce the life of the power train components. Additionally, each unique system may include unique frequencies at which torsional vibrations are produced. Different loads, different rotating assemblies, and different equipment will all produce torsional vibrations at their own respective frequency. As a result, it is desirable to dampen these torsional vibrations as they are known to physically vibrate the system with such force that, not only can the clutch be damaged, but the entire drive line may be damaged as well.

In addition to the above-mentioned components influencing torsional vibrations, other devices may contribute as well. For example, in hydraulic fracking, a pump is used to pump hydraulic fluid deep into the ground. Both the engine and the pump produce vibratory pulsations during the power stroke which manifest as torsional vibrations in the system.

Vibration absorbing couplings have been used to absorb these types of vibrations. While the couplings are effective, they come at a significant cost and add considerable size to the torque converter and clutch mechanism. As a result, it is optimal to reduce or eliminate torsional vibrations without any added components, but with software control of clutch pressure and clutch slippage.

As a result, it has been proposed to operate the clutch in a slipping mode, wherein a predetermined amount of slippage between the torque converter and clutch is permitted. In such a system, the objective is to isolate engine torque perturbations in the torque converter, while passing steady state engine torque at a slip rate that provides improved torque converter efficiency and extends component life.

A typical clutch transfers rotational force through a coefficient of friction applied against the torque converter. This transfer is nonlinear in nature, and the potential for instability is present at various slip speeds. Characteristically, the fluid pressure required to maintain a given level of slippage tends to decrease as the slippage increases. As a result, there is a tendency for the slippage control to completely engage the clutch with maximum pressure in response to a condition for which the measured slip exceeds the desired slip.

One common application where torsional vibrations are experienced and require dampening is found in the hydraulic fracturing industry, which uses a hydraulic torque converter with a lock-up clutch. In hydraulic fracturing applications, in order to achieve maximum efficiency, the lock-up clutch is preferably fully engaged 100% of the time a fracking pump is in operation. Because the lock-up clutch is fully engaged, the hydraulic torque converter does not have the ability to absorb the torsional vibrations that are created by the engine and the fracking pump. Torsional vibrations are known to spike in this fully locked condition, especially if a critical harmonic frequency exists in the operating range. Excessive torsional vibrations can reduce the life of various components in the powertrain system. An improved method to reduce these torsional vibrations was therefore needed.

SUMMARY AND OBJECTS OF THE INVENTION

A clutch slip control system incorporating an improved pressure and slip speed scheduling technique for improving stability, component life, and performance is provided. Using the preferred embodiments, improvement of the response of the control system to variations in steady state engine torque allows for a decrease in the amount of engine torque vibrations transmitted to the powertrain through the torque converter clutching device.

In the preferred embodiments, a method of reducing torsional vibrations in a drive may be accomplished by controlling at least one of a clutch engagement pressure, an input shaft speed, and an output shaft speed of the drive; and maintaining a positive slope of a clutch coefficient of friction over a clutch slip speed.

The method further includes providing an open loop control of clutch pressure by fully engaging the clutch for a predetermined time, setting the clutch engagement pressure to a predetermined pressure, thus allowing a predetermined clutch slip speed, and monitoring the clutch slip speed, wherein the clutch engagement pressure is maintained when the clutch slip speed is equal to or less than the predetermined clutch slip speed. When the clutch slip speed is greater than the predetermined clutch slip speed, the clutch engagement pressure may be increased to fully engage the clutch for a predetermined time and clutch engagement pressure may then subsequently be reduced to maintain a clutch slip speed equal to or less than the predetermined clutch slip speed. Additionally, the predetermined clutch slip speed may provide a positive slope of the clutch coefficient of friction over the clutch slip speed.

Another method of reducing torsional vibrations in a drive may further include providing a closed loop control of clutch speed by fully engaging the clutch for a predetermined time, setting the clutch engagement pressure to a predetermined pressure, thus allowing a predetermined clutch slip speed, continuously adjusting the clutch engagement pressure to maintain the predetermined clutch slip speed, and monitoring the clutch engagement pressure, wherein when the clutch slip speed is equal to or less than the predetermined clutch slip speed, the clutch engagement pressure is maintained.

When the clutch slip speed is greater than the predetermined clutch slip speed, the clutch engagement pressure may be increased to fully engage the clutch for a predetermined time, and the clutch engagement pressure may then be subsequently reduced to achieve a clutch slip speed equal to or less than the predetermined clutch slip speed. Ultimately, the predetermined clutch slip speed provides the positive ratio of the clutch coefficient of friction over the clutch slip speed.

In another embodiment, the method of reducing torsional vibrations in a drive may include providing a closed loop control of clutch pressure. This may be accomplished by fully engaging the clutch for a predetermined time, setting the clutch engagement pressure to a predetermined pressure, thus allowing a predetermined clutch slip speed, maintaining a constant clutch engagement pressure to maintain the predetermined clutch slip speed, and monitoring the clutch engagement pressure wherein when the clutch slip speed is equal to or less than the predetermined clutch slip speed, the clutch engagement pressure is maintained.

When the clutch slip speed is greater than the predetermined clutch slip speed, the clutch engagement pressure may then be increased to fully engage the clutch for a predetermined time, and the clutch engagement pressure may also be subsequently reduced to achieve a clutch slip speed equal to or less than the predetermined clutch slip speed.

In yet another embodiment, the method of reducing torsional vibrations in a drive may include providing a closed loop control of clutch pressure and clutch slip speed by fully engaging the clutch for a predetermined time, setting the clutch engagement pressure to a predetermined pressure, thus allowing a predetermined clutch slip speed, continuously adjusting the clutch engagement pressure to maintain the predetermined clutch slip speed, and monitoring the clutch engagement pressure, wherein when the clutch slip speed is equal to or less than the predetermined clutch slip speed, the clutch engagement pressure is maintained.

When the clutch slip speed is greater than the predetermined clutch slip speed, the clutch engagement pressure may be increased to fully engage the clutch for a predetermined time, and the clutch engagement pressure may then subsequently be reduced to achieve a clutch slip speed equal to or less than the predetermined clutch slip speed.

In any of the embodiments, a hydraulic torque converter may be used with a lock-up clutch within the hydraulic torque converter.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
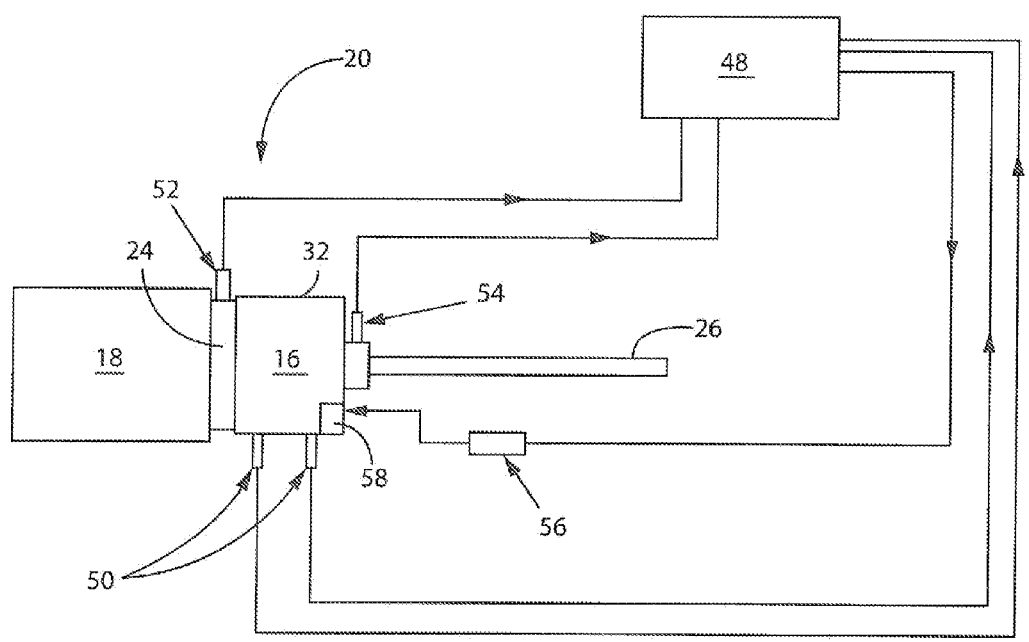
FIG. 1 illustrates a schematic of a powertrain and electronic control system according to the preferred embodiments.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention and the various features and advantageous details thereof are explained more fully with reference to the non-limiting embodiments described in detail in the following description.

Beginning with FIG. 1, the lock-up clutch 16 is nested inside a hydraulic torque converter 32. A clutch apply piston 58 is opposed by the torque converter's internal circuit pressure. As a result, total clutch torque capacity is determined by the difference between clutch apply pressure minus the torque converter's "basic" pressure. This is commonly referred to as differential pressure.

The implementation of this "trimmed lock-up clutch" includes the control of the lock-up clutch pressure by means of a proportional pressure valve 56 that is in turn controlled by an electronic control unit 48. The electronic control 48 may monitor lock-up clutch pressure, converter outlet pressure, torque converter input and output speed, and an engine load signal.

In order to reduce torsional vibrations in the entire drive, the clutch may be slipped in a controlled manner. Clutch slip is defined by engagement of the clutch in a less than fully locked situation. In other words, the engagement pressure, or clutch pressure, is reduced such that the surface of the clutch drags, or "slips" across a mating surface in the torque converter. Clutch slip is also measured in rotations per minute, or RPM. The clutch slip speed is calculated by observing the input shaft rotational speed and comparing that to the output shaft rotational speed. The slip speed is the rotational speed difference between the two shafts.

Clutches are designed with a certain coefficient of friction that enables them to transfer rotational force to another object when a force is applied. In this situation, the force is generated by the clutch pressure and transfers rotational force from the engine to the torque converter and output. The greater the coefficient of friction in the clutch, and/or the engaging force applied to the clutch, the more ability the clutch has to remain fully locked without slipping.

As a result, to minimize the torsional vibrations, the lock-up clutch 16 may be initially engaged by providing maximum clutch pressure to fully engage the clutch 16. After a brief time (3 to 10 seconds) the lock-up clutch 16 pressure may be reduced to a lower pressure to allow the clutch to slip in the region of 5 to 20 RPM. The engine load at full lock-up may be used in an algorithm to determine the initial reduction in lock-up clutch pressure. Then, the slip speed in the clutch may be used to maintain the desired 5 to 20 RPM slip by raising or lowering the lock-up clutch pressure accordingly.

In order to control the activation and clutch pressure the controller 48 can be designed with several variations including open loop control by simply presetting the clutch apply pressure to the required differential pressure to carry maximum rated engine torque, closed loop control dependent on sensed clutch differential pressure to set the clutch apply pressure at the desired level, and closed loop control based on clutch slip speed, adjusting the clutch pressure to maintain a desired clutch slip, and closed loop control based on both clutch slip speed and clutch differential pressure to set the clutch apply pressure at the desired level. These four variations are further described below with reference to FIGS. 9-12. In all four design options the key factor is the characteristic curve for the clutch material's coefficient of friction verses clutch slip speed.

The lock-up clutch is designed with a specific coefficient of friction. The friction vs. slip speed curve is normally assumed to produce a maximum coefficient of friction at zero slip. In this case, the coefficient of friction is understood to achieve a maximum value just prior to zero slip and then decrease as the slip approaches.

Figure 2:
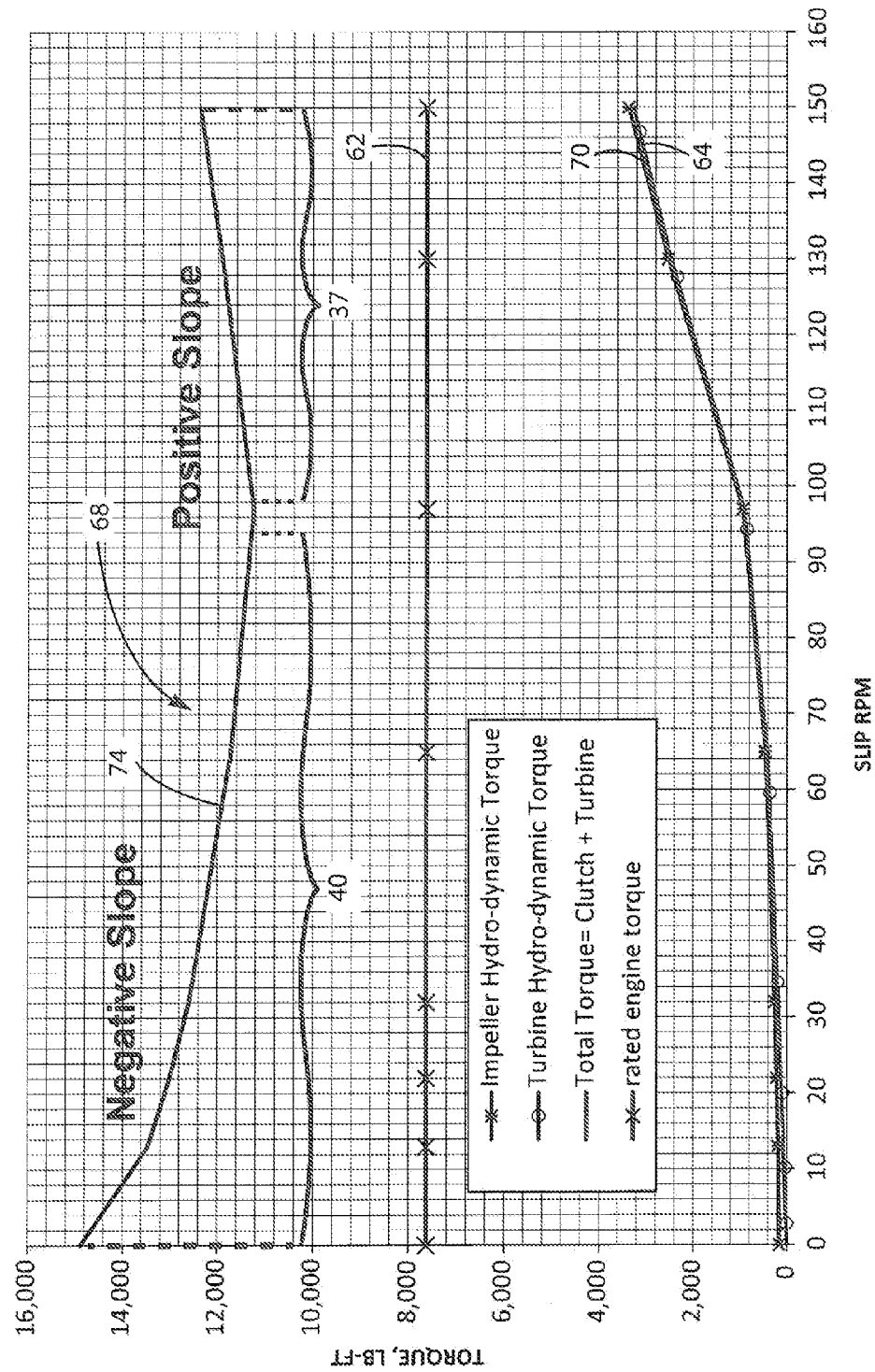
FIG. 2 illustrates a graphical representation of torque and clutch slip speed according to the prior art.

FIG. 2 shows how the industry perceived the torque in a powertrain prior to the invention. In this previous model for a given engine it includes a total torque curve 68, engine rated torque 62, the torque converter impeller torque 70 and the torque converter's turbine torque 64. Total torque 68 is defined as the combination of the torque capacity of the lock-up clutch capacity and the torque converter's hydrodynamic turbine torque.

In this model, the total torque 68 includes a region of negative slope indicated by region 40 when compared to clutch slip speed following the onset of slipping the clutch. Slipping a clutch can be unstable, as understood in the art, when working in the negative slope region of the torque curve. This is because the clutch can progress to less slip without any increase in clutch apply pressure. The total torque curve is calculated using the effective clutch coefficient of friction, which as stated above changes as clutch slip speeds change. As shown, the total torque curve 68 flattens at higher slip speeds, starting at about approximately 95 RPM (slip). At higher slip speeds, though characterized by a more desirable positive slope region 37 (more stable slip control), drawbacks of operating in region 37 include excessive heat loss in the clutch and torque converter resulting in reduced power efficiency. These drawbacks occur as a result of the clutch slip speed. As a clutch slips, energy is released from the system in the form of heat. When the clutch is fully engaged, with a high coefficient of friction, there is essentially no slippage and no heat is generated from dragging the clutch face across a surface of the torque converter. The more slippage, the more heat is generated. For this reason, the torque curve region 37 while being desirable for including a positive slope in the torque curve is undesirable for the amount of heat produced and power loss.

As previously mentioned, the torque curves are calculated by combining the torque capacity of the lock-up clutch and the hydrodynamic contribution of the torque converter through the turbine shaft. These calculations all factor the clutch coefficient of friction which is a variable that changes as clutch slip speeds change. The prior art model of FIG. 2 is therefore calculated using clutch coefficient of friction data, measured in Mu units, shown in FIG. 3. The previously accepted standard friction vs. clutch slip curve 74 has traditionally been used in the prior art to define the coefficient of friction in clutches as they slip. In this typical curve 74, the coefficient of friction has a region of negative slope 40 from the onset of clutch slip until about 260 RPM. After about 260 RPM, slip speed curve 74 exhibits a relatively flat slope 37. However, it has been determined that the coefficient of friction behaves differently in the region near zero clutch slip, as represented by the more realistic coefficient of friction curve 76. Curve 76 exhibits a positive slope at region 38 shown in FIG. 3. This positive slope region (between, for example, about 0 and 30 slip RPM, which is shown here as between about 0 and 25 slip RPM in this case) is what makes the control of a slightly slipping clutch possible in the preferred embodiments.

Figure 3:
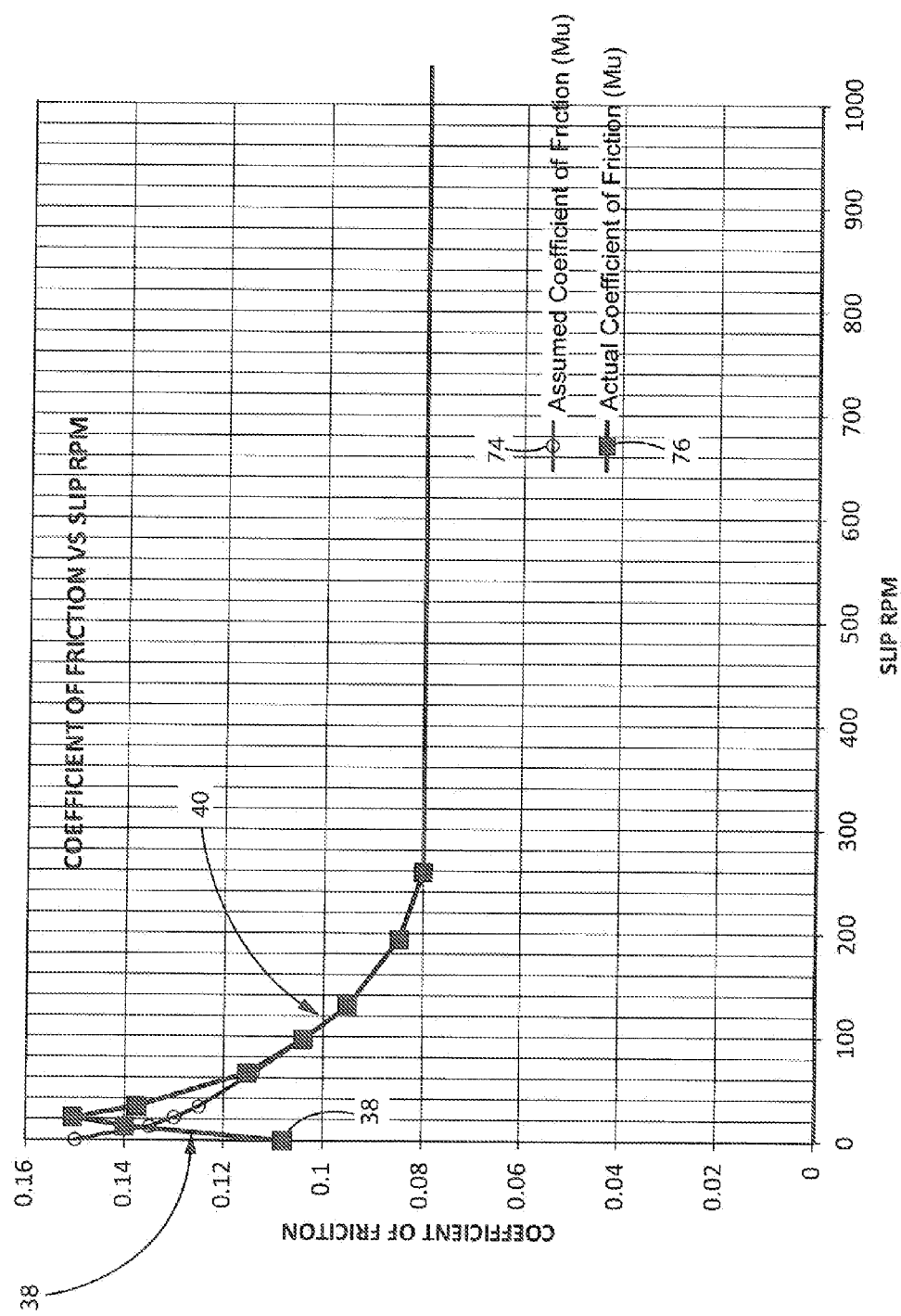
FIG. 3 illustrates an additional graphical representation of clutch friction and clutch slip speed according to the preferred embodiments.
Figure 4:
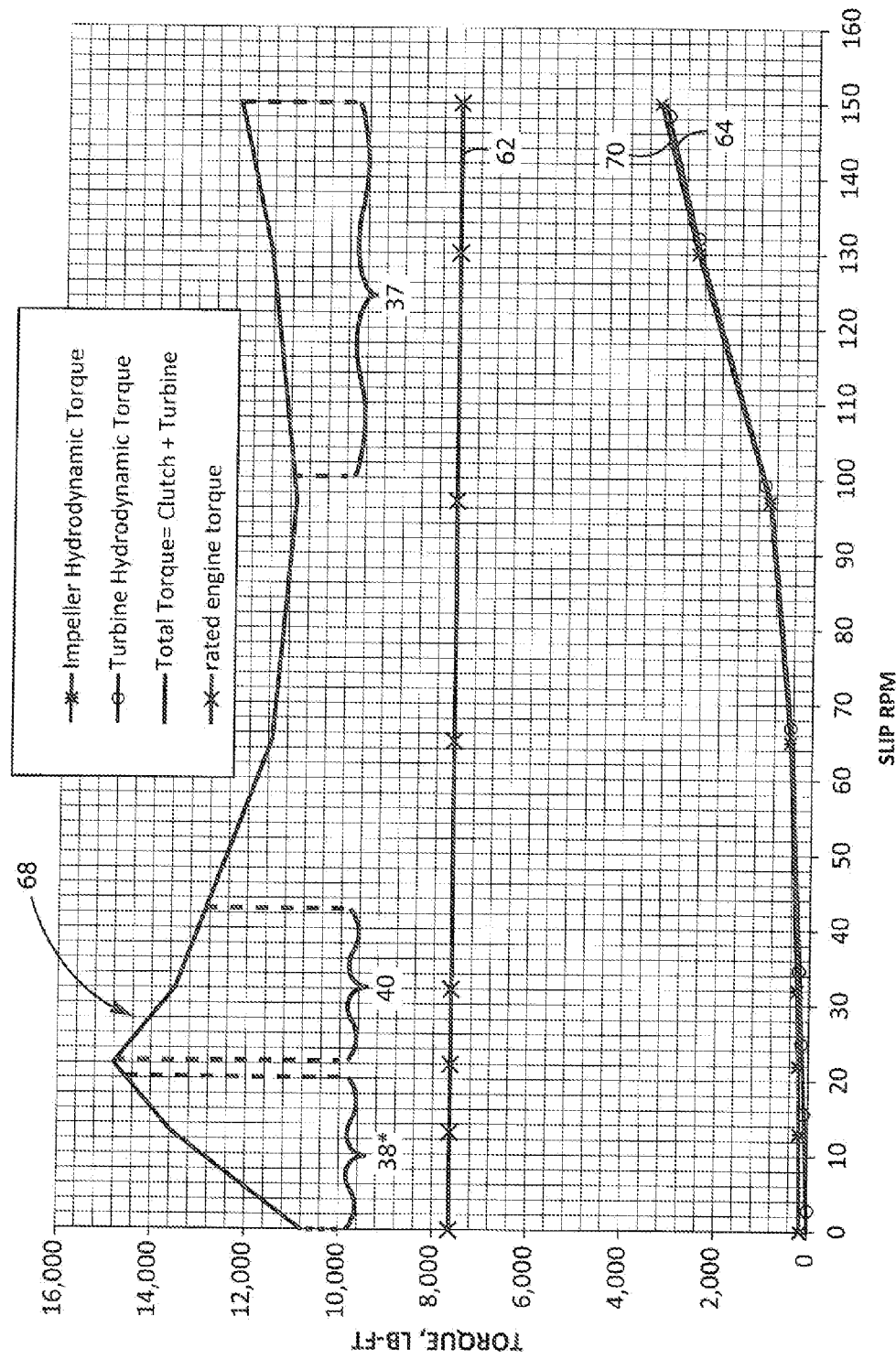
FIG. 4 illustrates an additional graphical representation of torque and clutch slip speed according to the preferred embodiments.
Figure 5:
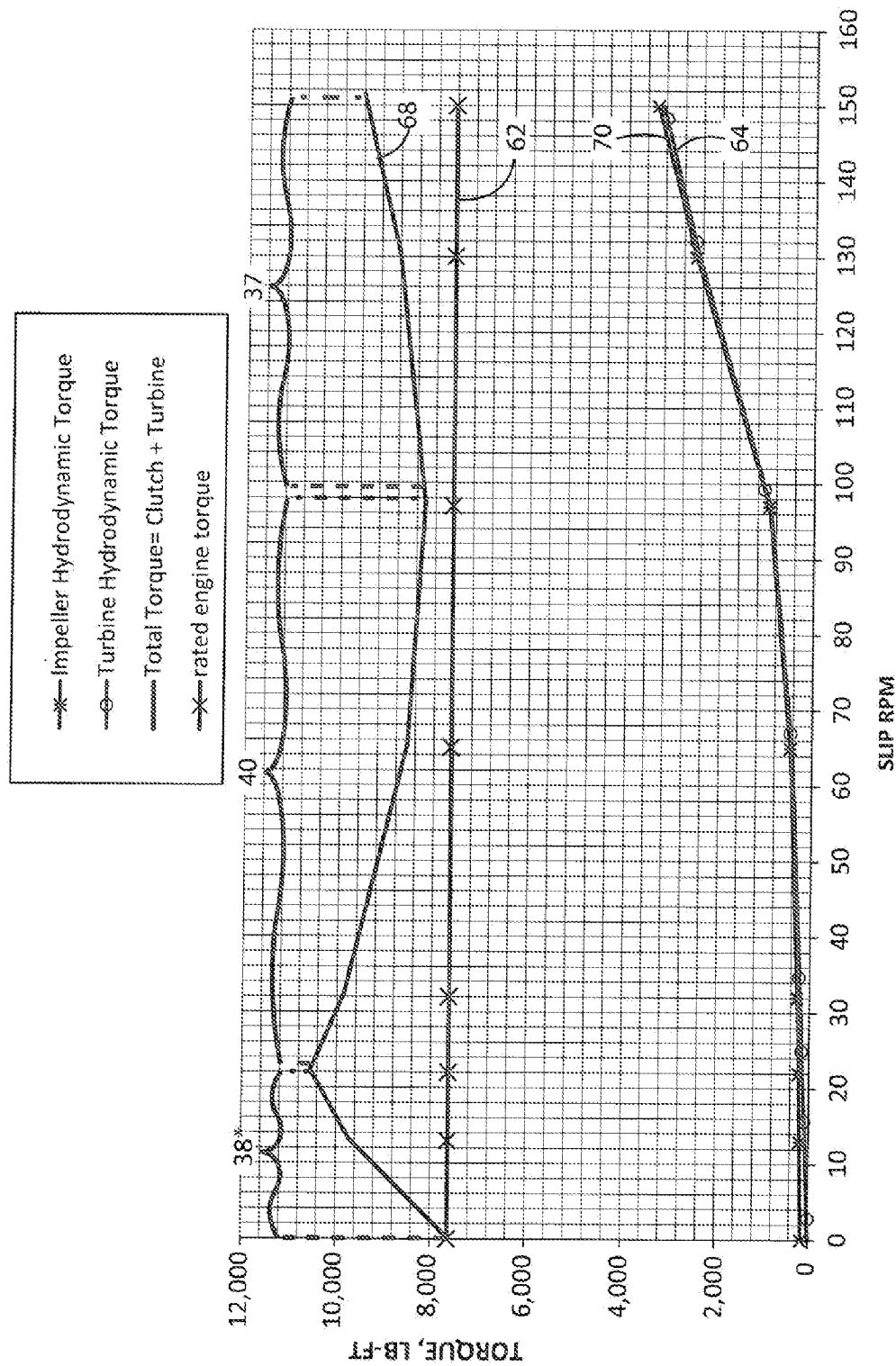
FIG. 5 illustrates a modified graphical representation of the torque and clutch slip speed according to FIG. 4, in which the clutch torque has been reduced to match the engine rated torque.

Generally, as shown in FIG. 3, the coefficient of friction plot has been considered to have a negative slope region 40 from the onset of clutch slip. The lock-up clutch capacity is proportional to the product of the applied force on the clutch plates and the coefficient of friction. The sum of the clutch capacity and the torque converter hydrodynamic turbine torque yields the total torque as shown in FIGS. 2, 4, and 5. The typical coefficient of friction plot 74 is used specifically to calculate the torque curves in FIG. 2. However, closer observation and testing data of the coefficient of friction reveals that as slip speeds approach zero slip, the slope of the curve becomes positive 38. This is shown by the more realistic coefficient of friction curve 76 in FIG. 3. This newly realized information is used to calculate the torque curves in FIG. 4 which prior to the present invention had not been recognized. In the prior art it was assumed that to operate on the desirable positive slope portion of a torque curve (68 in FIG. 2), one would have to slip the clutch at higher speeds (greater than 95 RPM). Again, actual test data exhibits an earlier positive slope in the coefficient of friction vs. slip RPM data (region 38 of FIG. 3). As a result, the negative effects of slipping a clutch at higher slip speed previously mentioned can be avoided as the total torque curve is kept in a positive slope region 38 (FIG. 4).

More particularly, the torque vs. converter slip speed is shown in a graphical plot in FIG. 4. In this situation, a lock-up clutch 16 and torque converter 32 were analyzed as the clutch 16 is initially allowed to slip by reduction of clutch pressure from the pressure required to fully engage it. As previously mentioned, the data collected from the "more realistic" coefficient of friction curve in FIG. 3 is used to calculate the total torque curve. On the far left X-axis, zero slip speed is shown. As the clutch slips, the clutch torque capacity actually increases significantly while the hydrodynamic contribution of the torque converter increases only slightly. The combination of the clutch torque and turbine torque 64 from the hydraulic fluid in the torque converter add together to form the total torque 68 curve. As clutch slip speed is increased, the total torque curve 68 develops a positive slope region 38. As suggested earlier, significant research has shown that operating and maintaining total torque in a positive slope region 38 is more stable and more controllable than a negative sloped region 40. The negative slope region 40 tends to be unstable and is difficult to control, and lessens the overall efficiency of the torque converter 32/lock-up clutch 16 package. In other words, when operating with the total torque curve 68 in a positive slope region 38, as the clutch 16 slips, more clutch capacity is gained as compared to operating in a negative slope region 40.

As previously explained, when slipping the clutch close to the zero slip region of FIG. 3, the coefficient of friction increases in the region from 0 to 25 RPM clutch slip. Since the capacity of the clutch is directly proportional to the coefficient of friction, as the clutch slip increases, the friction increases and thus the clutch capacity increases. If the clutch pressure is held constant and the clutch is at the point of zero slip, then the only motivation for the clutch to move away from the zero slip point is when an increase in applied torque occurs. This increase in applied torque typically comes from torsional excitation, either from the engine side or the frac pump side or both.

When the data from the clutch coefficient of friction more realistic curve 76, as seen in FIG. 3, is used to determine total clutch torque 68 in FIGS. 4-5, the total torque curve shown in FIG. 2 is more accurately represented by the torque vs. slip speed curve shown in FIG. 4. In this case, operation in the positive slope region 38 of the torque vs. slip speed curve is maintained if the clutch slip speed is less than approximately 22 RPM. The unique approach of the invention maintains a very low clutch slip to stay in the positive slope region 38 close to full lock-up clutch engagement. The net effect is a slightly slipping lock-up clutch with a capacity matched to the nominal rating of the engine torque, thus allowing the lock-up clutch to partially "filter out" torque disturbances above this capacity.

The sum of the engine nominal torque 62 plus the torsional excitations will be limited by the static capacity of the lock-up clutch 16. When the engine nominal torque plus torsional excitations reaches the static capacity of the lock-up clutch 16, the clutch will begin to slip and limit the torque to the static capacity of the lock-up clutch 16. The static capacity of the clutch 16 is defined as the amount of torque the clutch is designed to carry in a locked-up condition at a predetermined, steady pressure.

In one example shown below in Table 1, an engine with a net power of 2760 HP at 1900 RPM is used for reference. With such an engine, it calculates to 7,629 lb-ft nominal engine torque. The normal static capacity of the lock-up clutch 16 as shown below in Table 1 is 14,877 lb-ft. By static capacity it is understood that the clutch can handle such a load when the load is steady and not changing. A clutch may slip with a sudden change in load, despite the total torque being less than the normal static capacity (as determined using the assumed coefficient of friction (with reference to FIG. 3)). Such a sudden shock is known to introduce a tremendous amount of strain on the clutch despite the actual level of the load. As stated, the normal static capacity of the lock-up clutch 16 is 14,877 lb-ft. This is nearly twice the nominal engine torque. Again, the engine nominal torque plus the torsional excitations from pulses or spikes in torque loads can reach this high torque value. These spikes may be produced by rotational vibrations in the powertrain, for example.

TABLE 1

Calculated Lock-up Capacity

| | | | |
|---|---|---|---|
| Main Pressure | 250 psi | Mean Radius | 7.065 in |
| Basic Pressure | 50 psi | No. of Active Surfaces | 6 |
| Piston OD | 16.302 in | Coefficient of Friction | 0.15 |
| Piston ID | 9.328 in | Static Torque Capacity | 14,877 lb-ft |
| Piston Area | 140.38 sq in | | |
| Clamp Force | 28,077 lb-ft | | |

If the capacity of the lock-up clutch is reduced by lowering the clutch apply pressure, the clutch will begin to slip at a lower torque value. Table 2 below shows that by reducing lock-up clutch pressure from 250 to 190 psi and by using the data of FIG. 3 pertaining to the actual coefficient of friction at certain slip RPM, the static clutch capacity is reduced from 14,877 to 7,498 lb-ft.

TABLE 2

Calculated Lock-up Capacity

| | | | |
|---|---|---|---|
| Main Pressure | 190 psi | Mean Radius | 7.065 in |
| Basic Pressure | 50 psi | No. of Active Surfaces | 6 |
| Piston OD | 16.302 in | Coefficient of Friction | 0.108 |
| Piston ID | 9.328 in | Static Torque Capacity | 7,498 lb-ft |
| Piston Area | 140.38 sq in | | |
| Clamp Force | 19,654 lb-ft | | |

When this reduced lock-up clutch value is used to calculate the clutch torque calculations, the data shown in FIG. 4 translates to that shown in FIG. 5. In other words, the torque plot shifts vertically along the y axis showing decreased overall torque.

The lock-up clutch 16 now has just sufficient capacity to support the engine nominal torque. Any increase in applied torque from torsional excitations will cause the clutch to slip. Torsional excitations manifest in the form of random torque spikes or periodic torsional excitations from the engine or the applied load. As the components move through various operating speeds and loads, the torsional vibrations may experience a harmonic frequency which can greatly increase the torque load.

Because the clutch capacity increases as slip speed increases, the clutch is allowed to remain stable, due to the clutch pressure reduction. The maximum torque allowed in the system will now be limited to 10,414 lb-ft as compared to 14,877 lb-ft. With the reduced lock-up clutch capacity system the torsional component is limited to 36.5% of the nominal engine torque. With the fully engaged lock-up clutch 16 the torsional component can reach 95% of the nominal engine torque 62.

FIG. 5 shows the clutch capacity equal to the nominal torque 62 delivered from the engine 18. So the clutch 16 can theoretically carry that engine 18 and drive the power from the engine 18 back to a transmission (not shown) and the output shaft 26 or another device such as a fracking pump.

History has shown, however, that the engine nominal torque 62 is going to be exceeded because of torsional disturbances that are added to the top of that nominal torque 62 curve. The clutch 16 will not handle this increased load as it is limited by the overall capacity of the lock-up clutch 16. Because the coefficient of friction 76 curve in FIG. 3 has a positive slope region from the onset of clutch slip, the capacity of the clutch goes from 7500 at static up to about 10,500 at 22 RPM during this positive slope region. As a result, the torsional component that is added may reach 10,000 lb-ft, whereas prior to slipping the clutch and operating in a fully locked clutch condition it could reach almost 15,000 lb-ft.

The slipped clutch 16 may be at only 36% torsional additive and the locked clutch 16 with full-clutch capacity may be at 95% torsional additive. As a result, a transmission in the slipped clutch scenario is subjected to significantly less torque spikes.

Additionally, there is another benefit independent of lowering the torque from 15,000 down to 10,500. The spring rate and the stiffness of the system may be changed. The slipped clutch scenario is similar to adding a soft shock-absorbing coupling because the clutch 16 is no longer rigid. The result is that it behaves substantially like a rubber or shock absorbing coupling. This happens as the natural frequency (or vibration harmonics) of the system is altered by slipping the clutch 16. Testing has shown critical frequencies in these operating ranges and they change as the ranges in a transmission are changed. Note that the transmission applied with the torque converter in this application has 9 distinct ratios (ratio being defined as the transmission output speed divided by transmission input speed). The ranges are often referred to as $1^{st}$ range, $2^{nd}$ range, etc. Each system is unique as they all have different physical properties that are more prone to torsional vibrations than others. By dynamically adjusting the slippage of the clutch 16, to stay in a positive slope region of FIG. 5, those natural frequencies may be eliminated in any system. This occurs as the natural frequencies at which the system experiences torsional vibrations are a direct product of the physical geometry and composition of the system. When the clutch is allowed to slip, this decouples the drive, or engine, from the rest of the system and alters the resonant frequency at which it experiences torsional vibrations. As a result, many systems, regardless of the physical shape or composition, may be tuned to dampen torsional vibrations through a controlled slip of the clutch.

Figure 6:
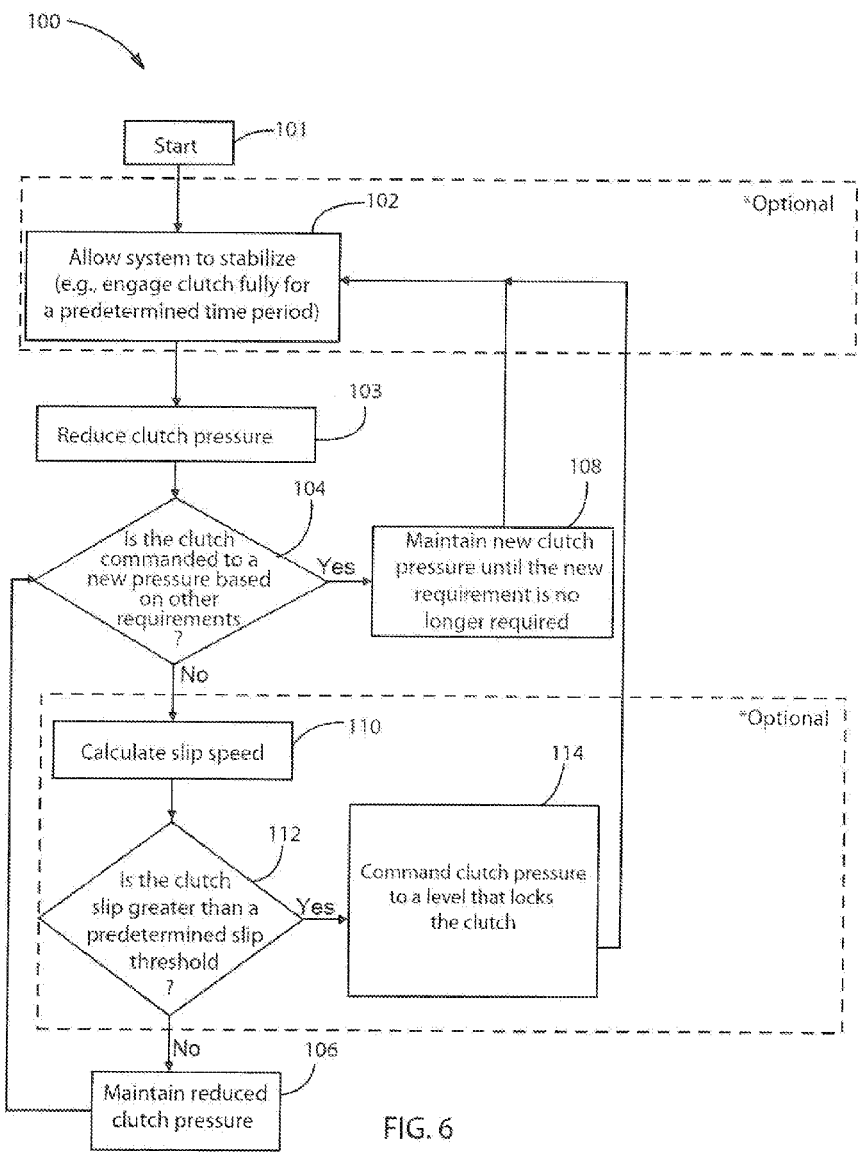
FIG. 6 illustrates a flow chart representing open loop logic of the electronic control system according to a preferred embodiment of the invention.

One preferred embodiment of a control method 100 provided by the present invention is shown in FIG. 6. In this embodiment, the controller 48 (FIG. 1) operates to control the clutch slip speed to remain in a positive slope region 38 with open loop control. This is accomplished by, after a startup and initialization Block 101, fully engaging the clutch for a predetermined amount of time in order to stabilize the system (e.g., achieve a state of no torsional vibrations) in Block 102. The system is stabilized when there is zero clutch slip. This could be monitored or a timer could be selected based on field testing. Notably, this is not required for the trimmed lockup clutch to function. The stabilization step is optional but helps ensure that the clutch is not damaged during setup as a result of sudden spikes in load. The clutch pressure, Block 103, may then be reduced to a predetermined pressure, which is calculated based on the harmonics of the given system. The predetermined pressure is set to a pressure that allows around 20 RPM clutch slip, which is determined during field calibration. In Block 104, if the clutch pressure is at a steady state level, meaning that the pressure is not set as a result of any operational requirements (for example, but not limited to, a request to shift gears), the pressure is maintained at the predetermined pressure setting in Block 106. On the other hand, if the pressure is set as a result of any operational requirements, no further action is taken until the operational requirement is no longer needed. In particular, if the clutch pressure is based on other requirements, a new clutch pressure is maintained in Block 108. Once the new requirement is no longer required, the stabilization process is restarted.

Once the predetermined pressure is met with no operational requirements, the slip speed is monitored and pressure maintained in order to keep the clutch slip speed in the positive slope region (38 in FIGS. 3 and 4, for example) as discussed earlier. More particularly, after the above-described steady state is maintained, the clutch slip speed may be monitored as shown in Block 110. These logic blocks may all be determined with the electronic control 48.

As slip speed is monitored, method 100 determines if the slip speed increases above the target window (i.e., a preset target threshold) in Block 112. The pressure is increased to lock the clutch for a predetermined amount of time in Block 114 and the process is reset (control returned to stabilization step in Block 102). This prevents excess slippage which can reduce clutch life. If clutch slip speed is maintained properly, the clutch pressure is maintained in Block 106 and the clutch slip speed may be continuously monitored as control is returned to Block 104 to determine if the commanded clutch pressure is based on operation requirements. Notably, monitoring clutch slip speed in Blocks 110-114 is optional in this embodiment.

Figure 7:
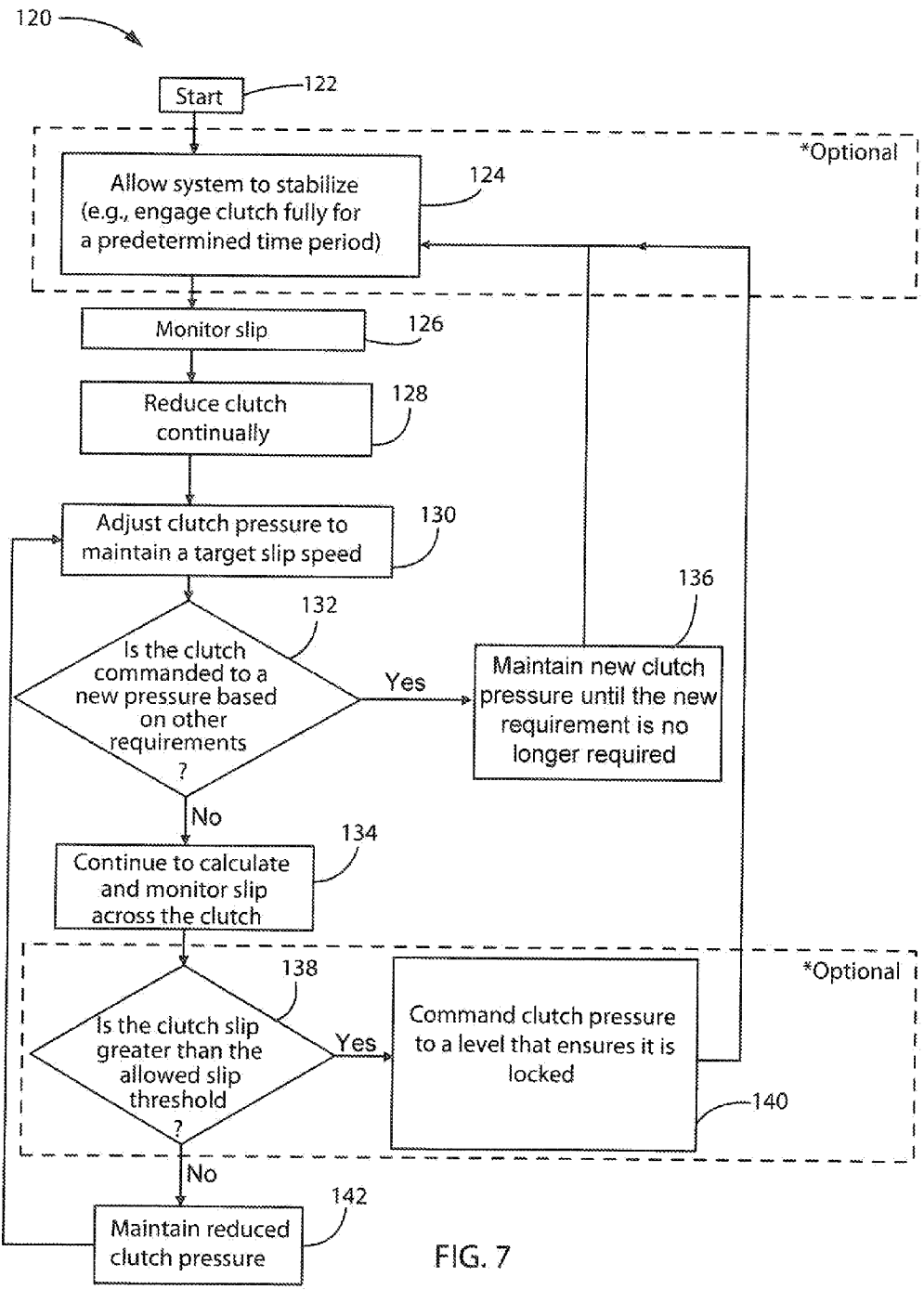
FIG. 7 illustrates a flow chart representing closed loop logic of the electronic control system using clutch slip speed according to a preferred embodiment of the invention.

Moving on to FIG. 7, an alternate method 120 of controlling the clutch slip speed to remain in the positive slope region with closed loop control is shown. In this embodiment of the invention, after a start-up and initialization step 122, the clutch engagement is first (optionally) set to a steady state pressure in Block 124. Next, in Block 126, clutch slip speed is monitored with various sensors, such as input shaft speed sensors 52, and output shaft speed sensors 54 shown in FIG. 1. Next, in Block 128 clutch pressure is reduced until the target slip speed 38 (FIG. 4) is obtained. Once obtained, clutch pressure is continuously adjusted in Block 130 based on the sensed data from the various sensors, which includes, but is not limited to, clutch slip speed. As a result, the target pressure window is not predetermined but dynamically changes with respect to the operating conditions sensed.

While clutch pressure is continuously adjusted in Block 130, method 120 determines whether the clutch pressure is based on any other requirements that may affect the steady state in Block 132. If not, the clutch slip speed continues to be monitored in Block 134. If the new clutch pressure is based on other requirements, the new clutch pressure is maintained in Block 136 and the stabilization process is restarted at Block 124. Next, in Block 138, method 120 determines if clutch slip speed increases above the target window threshold. If so, clutch pressure is increased to lock the clutch for a predetermined amount of time in Block 140 (i.e., reduced clutch pressure is not commanded again until a predetermined period of time has lapsed), and the process is reset. This prevents excess slippage which can reduce clutch life. If clutch slip is below the allowed threshold, the clutch pressure is maintained in Block 142 and the clutch pressure is continuously monitored to maintain the target slip speed.

Figure 8:
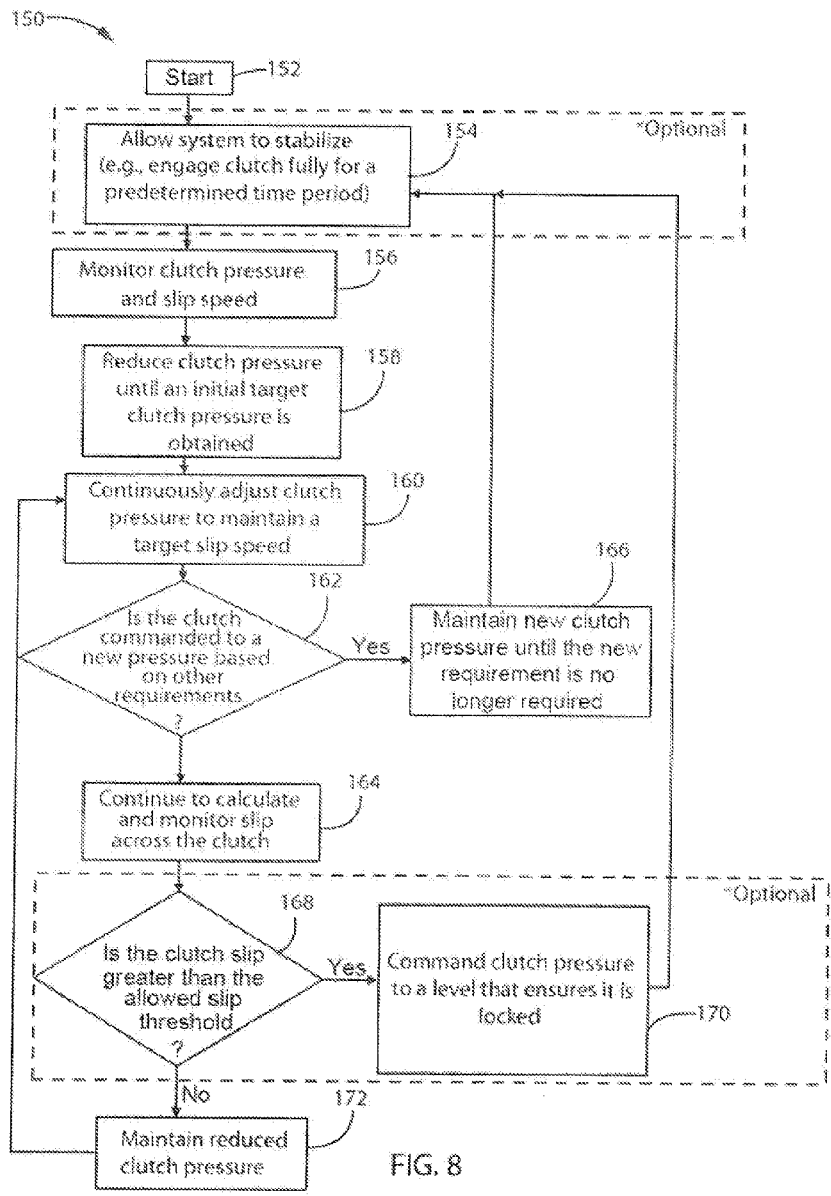
FIG. 8 illustrates a flow chart representing closed loop logic of the electronic control system using clutch pressure and clutch slip speed according to a preferred embodiment of the invention.

FIG. 8 illustrates another embodiment of closed loop clutch control using both clutch pressure and clutch slip speed. In this embodiment, a method 150, after a start-up and initialization step 152, clutch engagement is first (optionally) set to a steady state (i.e., zero clutch slip) in Block 154. Next, in Block 156, clutch slip speed, as well as clutch pressure, are both monitored with various sensors, such as pressure sensors 50, input shaft speed sensors 52, and output shaft speed sensors 54, shown in FIG. 1. In Block 158, clutch pressure is reduced until an initial target clutch pressure is obtained. Once obtained, in Block 160, clutch pressure is continuously adjusted to maintain a threshold/target slip speed based on sensed data from the various sensors, which includes but is not limited to, clutch slip speed.

While clutch pressure is continuously adjusted in Block 160, Block 162 asks if the clutch pressure is based on any other requirements that may affect the steady state. If not, the clutch slip may continue to be monitored in Block 164. If the clutch pressure is based on other requirements, the new clutch pressure is maintained in block 166 and the process is restarted at Block 154. Next, Block 168 asks if clutch slip speed is greater than an allowed slip speed threshold. If so, the pressure is increased to lock the clutch for a predetermined amount of time in Block 170 and the process is reset. This prevents excess slippage which can reduce clutch life. If not, i.e., clutch slip speed is below the threshold, the clutch pressure is maintained in Block 172 and the clutch is continuously monitored.

Figure 9:
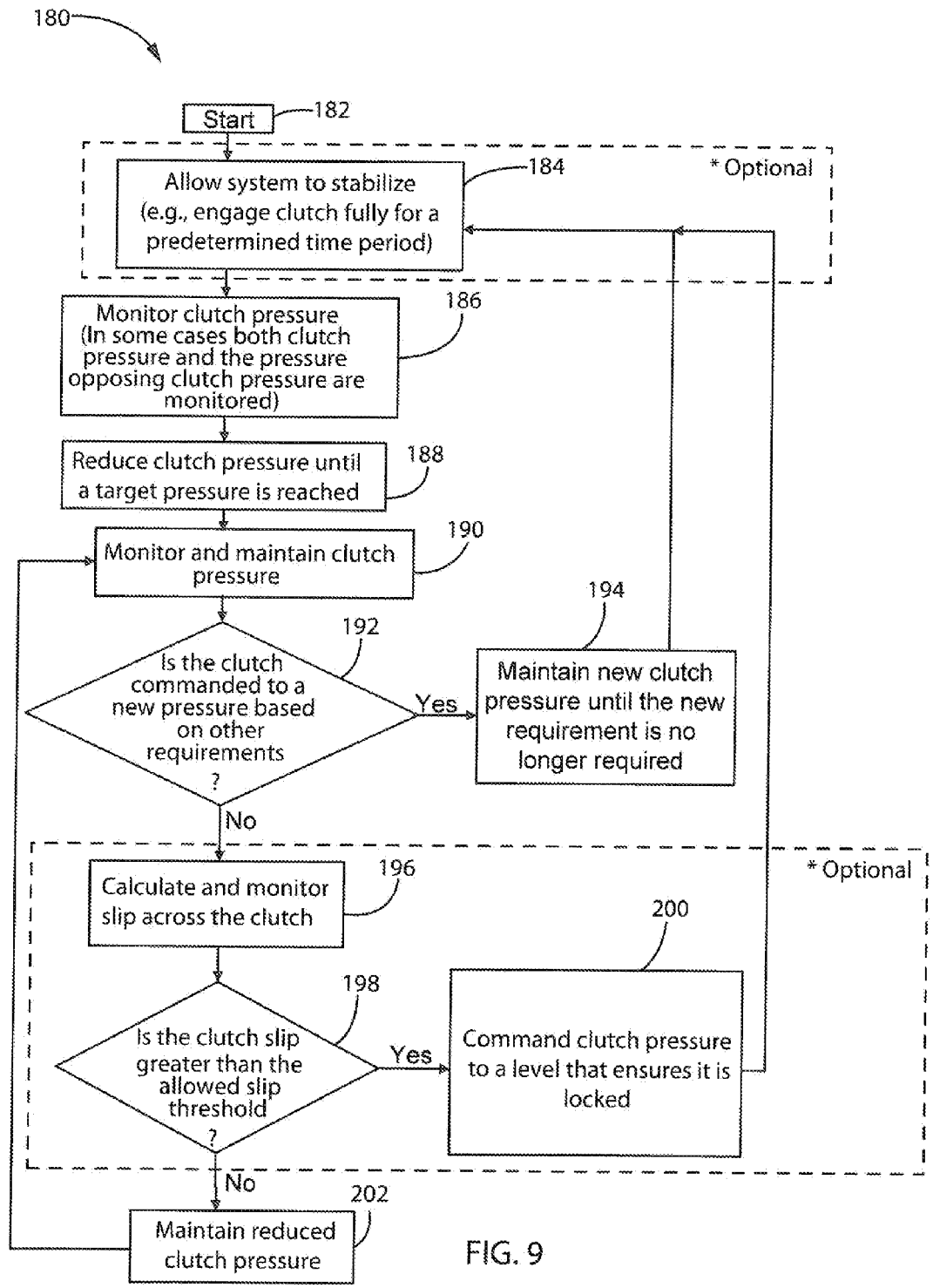
FIG. 9 illustrates a flow chart representing closed loop logic of the electronic control system using clutch pressure according to a preferred embodiment of the invention.

Lastly, FIG. 9 shows yet another embodiment consisting of closed loop clutch control method 180 using only clutch pressure. In this embodiment, the entire system is allowed to stabilize in Block 184 after a start-up and initialization step in Block 182. Following stabilization, clutch pressure is monitored in Block 186. Both clutch pressure and pressure opposing the clutch pressure may be monitored. Next, in Block 188, clutch pressure is reduced until a target pressure is achieved. When clutch opposing pressure is also monitored, clutch pressure is reduced until the target delta pressure, or difference between clutch pressure and opposing clutch pressure, is achieved.

Once the optimal target pressure is reached and set, clutch pressure is continuously monitored and maintained in Block 190 in order to keep the clutch slip speed in the positive slope region 38 (FIG. 4), as discussed earlier. After this steady state is achieved, Block 192 determines whether the new clutch pressure is based on any other operational requirements. If the clutch pressure is based on other requirements, the new clutch pressure is maintained in Block 194 and the process is restarted. If not, the clutch slip may be monitored in Block 196. These logic blocks may all be determined with the electronic control 48.

As the slip speed is monitored, Block 198 determines whether the slip speed has increased above the target window (i.e., allowed the slip speed threshold). If so, the pressure is increased to lock the clutch for a predetermined amount of time in Block 200 and the process is reset. This prevents excess slippage which can reduce clutch life. If not, i.e., if clutch slip is below the threshold, the clutch pressure is maintained in Block 202 and the clutch is continuously monitored (control returned to Block 190).

Referring to FIGS. 10A-10E, data gathered during testing of a lock-up clutch with full clutch pressure applied is shown. In this example, the clutch is fully engaged and is transferring rotational power to a pump. The pump is also experiencing a full load. The data present in FIG. 10B to 10E is at time 54.4 seconds, as seen by the cursor mark in FIG. 10A. The transmission was in $7^{th}$ range for this example.

Figure 10A:
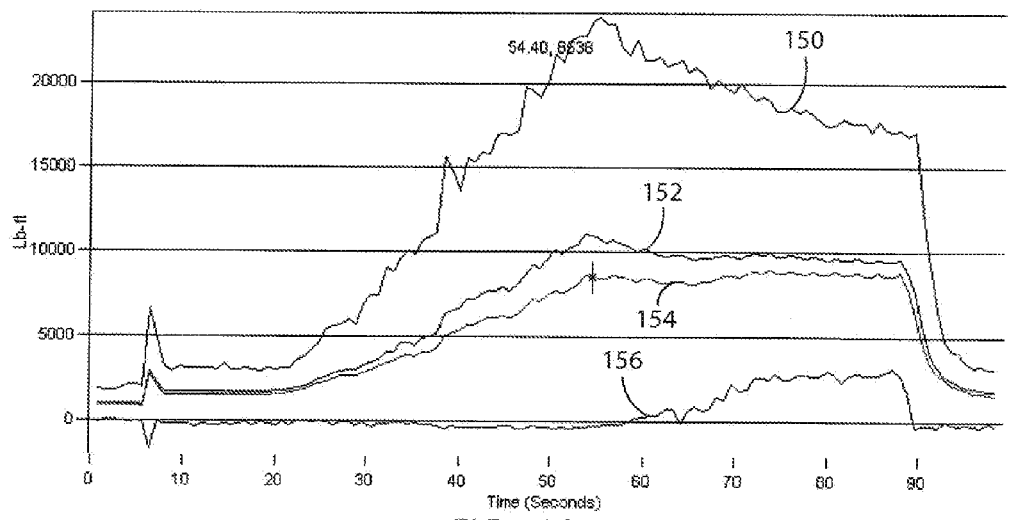
FIG. 10A illustrates collected data in graphical form showing total torque in the drive during testing of a lock-up clutch in full engagement with no slip.
Figure 10B:
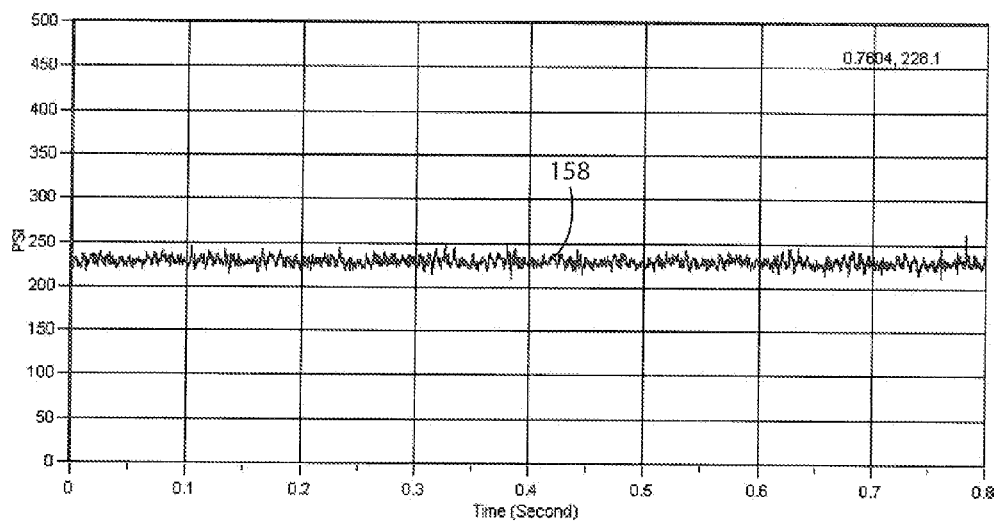
FIG. 10B illustrates collected data in graphical form showing consistent pressure application during testing of a lock-up clutch in full engagement with no slip.
Figure 10C:
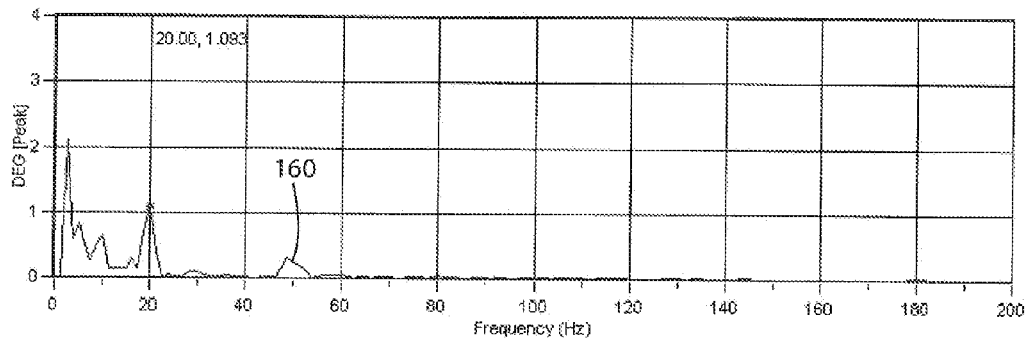
FIG. 10C illustrates collected data in graphical form showing torsional displacement at the transmission input speed sensor during testing of a lock-up clutch in full engagement with no slip.
Figure 10D:
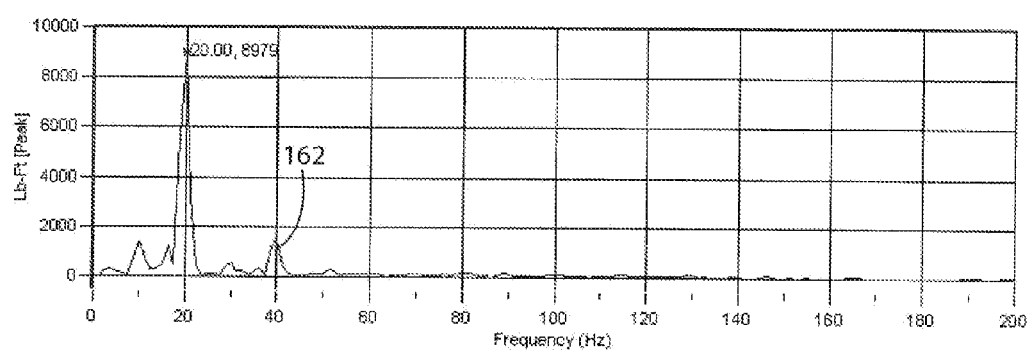
FIG. 10D illustrates collected data in graphical form showing the frequency spectrum of the transmission input torque loads during testing of a lock-up clutch in full engagement with no slip.
Figure 10E:
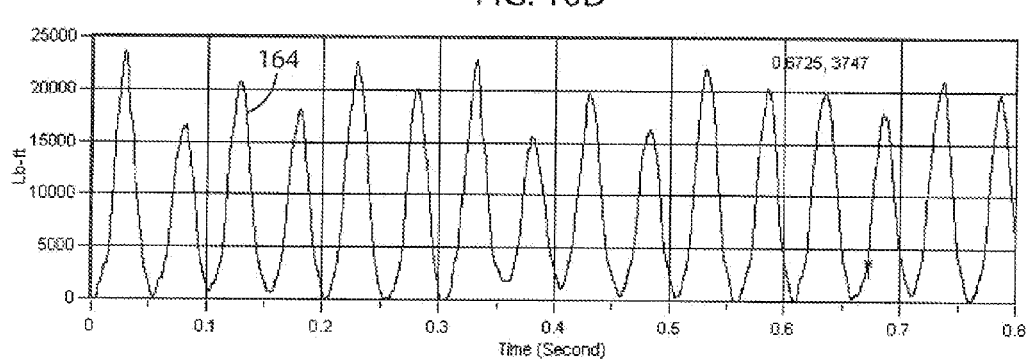
FIG. 10E illustrates collected data in graphical form showing time waveform of the transmission input torque during testing of a lock-up clutch in full engagement with no slip.

FIG. 10A shows the maximum torque 150, root mean squared (RMS) torque 152, mean torque 154, and minimum torque 156 curves versus time as load is being applied to the frac pump. FIG. 10B shows the lock-up clutch pressure 158, which remains fairly constant, applied to the clutch to maintain full lock-up over time. FIG. 10C shows the frequency spectrum of the torsional displacement 160 in Degrees, 0 to peak, sensed at a transmission input speed sensor. FIG. 10D shows the frequency spectrum of the transmission input torque 162 in Lb-ft, 0 to peak. Note that at about 20 Hz, torque drastically spikes to almost 9,000 lb-ft. This is evidence of a torsional vibration that is known to drastically vibrate the equipment, and, may cause damage to various components in the powertrain. Lastly, FIG. 10E shows transmission input torque 164 along time. FIG. 10E is the same data as FIG. 10D but displayed as torque vs. time rather than frequency. The predominant 20 Hz appears to be a natural frequency of the power train and is excited by the load pulses of the three (3) piston frac pump.

Now transitioning to FIGS. 11A-11E, data gathered during testing of the same lock-up clutch described above with respect to FIGS. 10A-10E, is shown; however, the clutch is regulated with the controlled slip of the present preferred embodiments. This is with the open loop as shown in FIG. 6, and as disclosed above, namely, clutch pressure is regulated below full clutch pressure. The slipped clutch is also transferring rotational power to a pump. The pump is also experiencing a full load, just as it was in FIGS. 10A-10E. The data presented in FIG. 11B to 11E is at time 75.2 seconds as seen by the cursor mark in FIG. 11A.

Figure 11A:
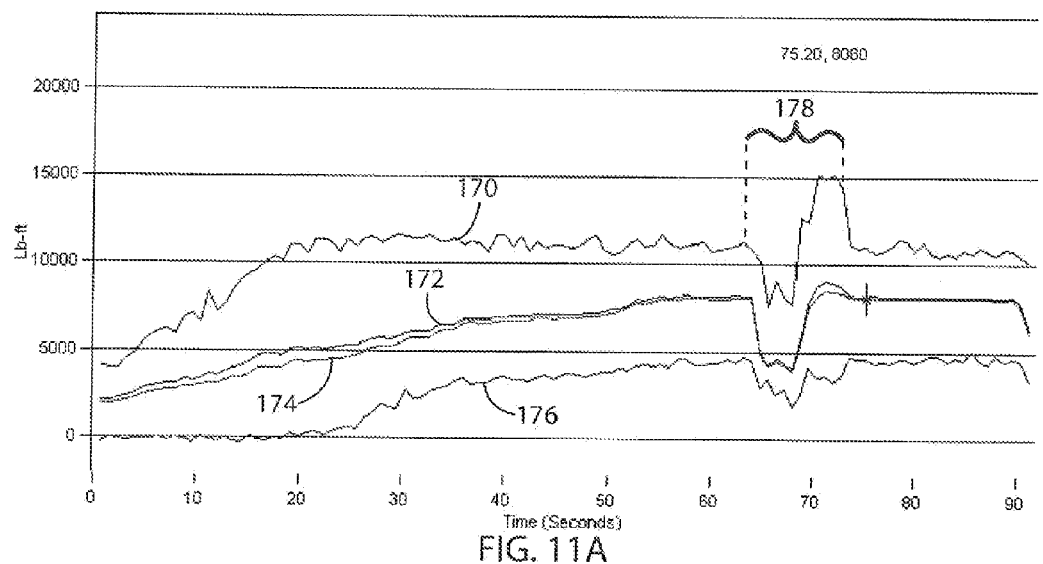
FIG. 11A collected data in graphical form showing total torque in the drive during testing of a lock-up clutch with a controlled slip speed according to the preferred embodiments.
Figure 11B:
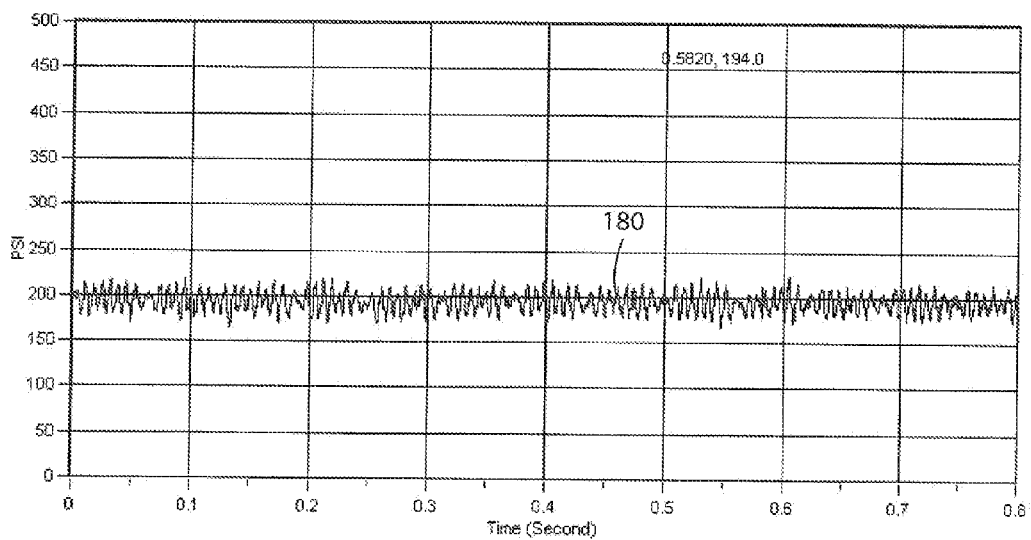
FIG. 11B illustrates collected data in graphical form showing consistently reduced pressure application during testing of a lock-up clutch with a controlled slip speed according to the preferred embodiments.
Figure 11C:
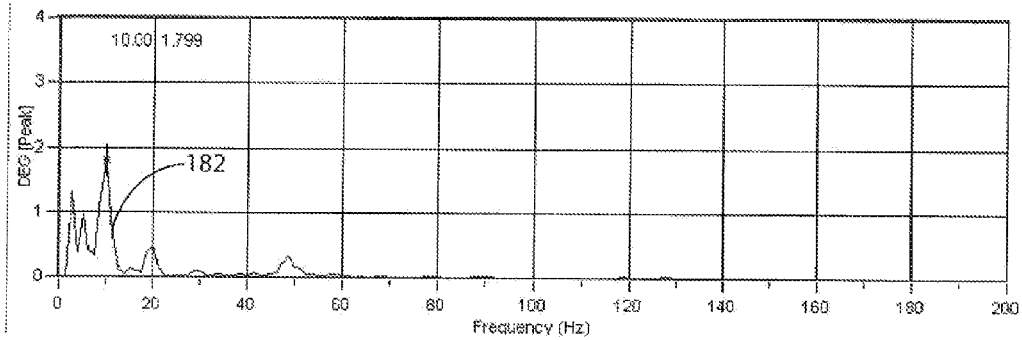
FIG. 11C illustrates collected data in graphical form showing torsional displacement at the transmission input speed sensor during testing of a lock-up clutch with a controlled slip speed according to the preferred embodiments.

FIG. 11A shows the maximum torque 170, root mean squared (RMS) torque 172, mean torque 174, and minimum torque 176 curves along time. The max torque sensed is significantly lower, as the clutch is in a controlled slip. The clutch, however, still powers the pump at the same max load. The transmission was in $7^{th}$ range while the load was being applied to the frac pump. Maximum load was reached at about 22 seconds. At 64 seconds, the transmission was shifted briefly to 6th range, then back to 7th range. Then after a predetermined amount of time the lock-up clutch pressure is reduced at time 75.2 seconds. This is the point at which the benefits of the slightly slipping lock-up clutch begin. This exercise demonstrates the transition from full engagement to partial engagement of the lock-up clutch. FIG. 11B shows the total pressure 180, which remains fairly constant, applied to the clutch to maintain the controlled slip along time. In this case, the applied torque is about 40 psi less than that shown in FIG. 10B, which is a full locked clutch condition. FIG. 1 IC shows the frequency spectrum of the torsional displacement 182 in Degrees, 0 to peak, sensed at a transmission input speed sensor.

Figure 11D:
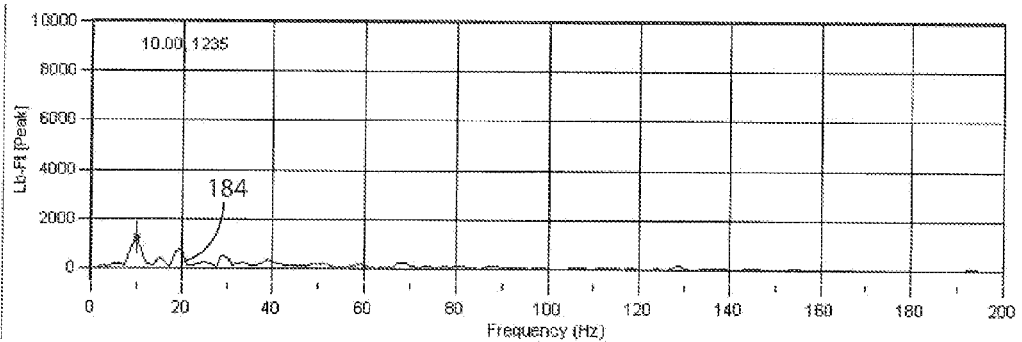
FIG. 11D illustrates collected data in graphical form showing the frequency spectrum of the transmission input torque loads during testing of a lock-up clutch with a controlled slip speed according to the preferred embodiments.
Figure 11E:
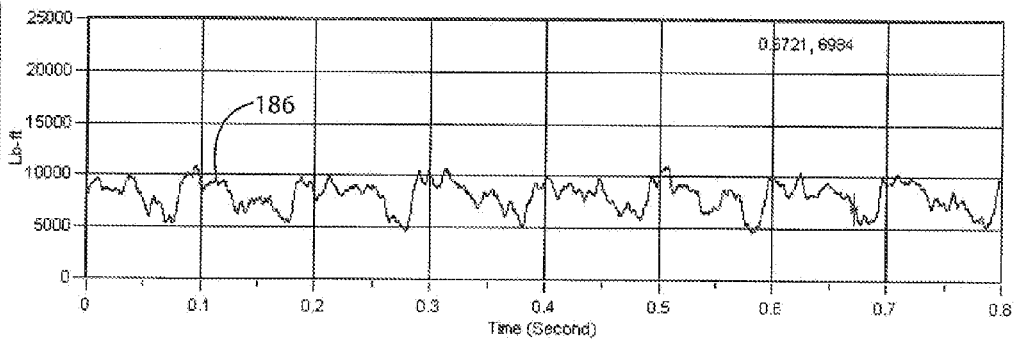
FIG. 11E illustrates collected data in graphical form showing the time waveform of the transmission input torque during testing of a lock-up clutch with a controlled slip speed according to the preferred embodiments.

FIG. 11D shows the frequency spectrum of the transmission input torque 184 in Lb-ft, peak to peak. Note that in the fully locked clutch shown in FIG. 10D, at about 20 Hz, torque drastically spikes to almost 9,000 lb-ft which shows a torsional vibration that is known to drastically vibrate the equipment, and, may cause damage to various components in the powertrain. In the slip controlled clutch of the preferred embodiments, the torsional spikes are nearly eliminated. Again, in powering the same pump at full load, there is less torque fluctuation through the clutch and input to the transmission, and drastically less maximum torque as there are no harmonic torsional torque spikes experienced. The controlled slip has therefore functioned as a coupling to eliminate the previously experienced torsional vibration. Lastly, FIG. 11E shows transmission input torque along time 186. The previously experienced sinusoidal torque curve is significantly leveled out preventing the drastic swings in torque that the transmission experiences. As appreciated, the periodic swings in torque amplitudes at the transmission input can cause damage to the entire powertrain even if the total torque is not surpassing a failure limit. This is due to the subsequent fatigue cycles, which has a particularly detrimental effect to the power train. With the preferred embodiments, such adverse consequences are avoided.

Any of the above embodiments may be used alone or in combination with one another. Also, as mentioned earlier, the control of clutch pressure may be done with software and an electronic control system using a multitude of sensors. It is also possible to manually adjust clutch pressure and visually monitor pressure readings. The goal with each embodiment is to maintain a clutch slip speed such that a positive slope of the torque vs. slip speed is maintained. As mentioned earlier, this may not be a consistent clutch slip speed or consistent pressure, but dynamically changes based on many factors such as clutch coefficient of friction, torque converter design, temperature, load, load resistance, engine type, size of input and output shafts, or any other element that may affect a harmonic resonance frequency of any component in the system.

What is claimed is:

1. A method of damping torsional vibrations in a drive line including a clutch, the method comprising the steps of:
   controlling a clutch slip speed of the clutch, and an output shaft speed of the drive; and
   wherein said controlling step includes maintaining a positive slope of a total torque of the drive line versus the clutch slip speed and wherein the maintaining the positive slope of the total torque of the drive line versus the clutch slip speed occurs at a slip speed of less than about 30 rotations per minute.

2. The method of claim 1, the method further comprising:
   wherein the controlling step provides an open loop control of the clutch slip speed.

3. The method of claim 2, wherein the controlling step includes:
   fully engaging the clutch for a predetermined time; and
   setting a clutch engagement pressure to a predetermined pressure thereby effecting a predetermined clutch slip speed.

4. The method of claim 3, wherein the controlling step further includes:
   monitoring the clutch slip speed wherein the clutch engagement pressure is maintained when the clutch slip speed is equal to or less than the predetermined clutch slip speed; and
   increasing, when the clutch slip speed is greater than the predetermined clutch slip speed, the clutch engagement pressure so as to maintain the positive slope.

5. The method of claim 4, wherein the increasing step includes fully engaging the clutch for a predetermined time; and further comprising reducing the clutch engagement pressure to maintain the clutch slip speed equal to or less than the predetermined clutch slip speed.

6. The method of claim 2, wherein a predetermined clutch slip speed provides the positive slope of total torque of the drive line versus the clutch slip speed.

7. The method of claim 1, wherein the controlling step provides a closed loop control of the clutch slip speed.

8. The method of claim 7, wherein the controlling step includes:
   fully engaging the clutch for a predetermined time;
   setting a clutch engagement pressure to a predetermined pressure thereby effecting a predetermined clutch slip speed; and
   continuously adjusting the clutch engagement pressure to maintain the clutch slip speed equal to the predetermined clutch slip speed.

9. The method of claim 7, wherein the controlling step further includes:
   monitoring a clutch engagement pressure; and
   wherein, when the clutch slip speed is equal to or less than a predetermined clutch slip speed, the clutch engagement pressure is maintained; and increasing, when the clutch slip speed is greater than the predetermined clutch slip speed, the clutch engagement pressure so as to maintain the positive ratio.

10. The method of claim 9, wherein the increasing step includes fully engaging the clutch for a predetermined time; and further comprising reducing the clutch engagement pressure to achieve the clutch slip speed equal to or less than the predetermined clutch slip speed.

11. The method of claim 7, wherein a predetermined clutch slip speed provides the positive slope of the total torque of the drive line versus the clutch slip speed.

12. The method of claim 1, the method further comprising:

wherein the controlling step provides a closed loop control of the clutch slip speed;
fully engaging the clutch for a predetermined time;
setting a clutch engagement pressure to a predetermined pressure thereby effecting a predetermined clutch slip speed; and
maintaining a constant clutch engagement pressure to maintain the predetermined clutch slip speed equal to the clutch slip speed.

13. The method of claim 12, wherein the controlling step includes monitoring the clutch engagement pressure wherein when the clutch slip speed is equal to or less than the predetermined clutch slip speed, the clutch engagement pressure is maintained.

14. The method of claim 13, wherein the controlling step further includes increasing, when the clutch slip speed is greater than the predetermined clutch slip speed, the clutch engagement pressure so as to maintain the positive slope.

15. The method of claim 14, wherein the increasing step includes fully engaging the clutch for a predetermined time; and further comprising reducing the clutch engagement pressure to achieve the clutch slip speed equal to or less than the predetermined clutch slip speed.

16. The method of claim 12, wherein the predetermined clutch slip speed provides the positive slope of the total torque of the drive line versus the clutch slip speed.

17. The method of claim 1, the method further comprising:
wherein the controlling step provides the closed loop control of the clutch slip speed;
fully engaging the clutch for a predetermined time;
setting a clutch engagement pressure to a predetermined pressure thereby effecting a predetermined clutch slip speed; and
continuously adjusting the clutch engagement pressure to maintain the predetermined clutch slip speed equal to the clutch slip speed.

18. The method of claim 17, wherein the controlling step includes monitoring the clutch engagement pressure wherein when the clutch slip speed is equal to or less than the predetermined clutch slip speed, the clutch engagement pressure is maintained.

19. The method of claim 18, wherein the controlling step further includes increasing, when the clutch slip speed is greater than the predetermined clutch slip speed, the clutch engagement pressure so as to maintain the positive slope.

20. The method of claim 19, wherein the increasing step includes fully engaging the clutch for a predetermined time; and further comprising reducing the clutch engagement pressure to achieve the clutch slip speed equal to or less than the predetermined clutch slip speed.

21. The method of claim 17, wherein the predetermined clutch slip speed provides the positive slope of the total torque of the drive over clutch slip speed.

22. The method of claim 1, further comprising the step of providing a hydraulic torque converter and wherein the clutch is a lock-up clutch within the hydraulic torque converter.

23. A method of reducing torsional vibrations in a drive line, the method comprising the steps of:
providing a clutch for the drive;
providing a torque converter with an impeller and a turbine within the torque converter configured to engage the clutch;
monitoring total torque including a clutch torque and a turbine torque;
monitoring a clutch slip speed;
continuously comparing total torque with clutch slip speed during operation of the drive line; and
maintaining a clutch slip speed such that the total torque divided by clutch slip speed produces a positively sloped function over time.

24. The method of claim 23, wherein the clutch slip speed is maintained by continuously adjusting a clutch pressure such that an increase in clutch pressure reduces clutch slip speed and a decrease in clutch pressure increases clutch slip speed.

25. The method of claim 23, wherein the clutch slip speed is maintained by setting and maintaining a predetermined clutch pressure.

26. The method of claim 25, wherein the predetermined clutch pressure is predetermined based at least in part on a resonant frequency of the drive line to dampen the torsional vibrations.

27. A system for damping torsional vibrations in a drive line without a use of a vibration absorbing coupling, the system comprising:
a controller that continuously compares a total torque, including a sum of clutch torque added to a turbine torque, and a clutch slip speed during operation of the drive; and
maintains the clutch slip speed such that the continuous comparison of total torque and clutch slip speed produces a positively sloped function of total torque over clutch slip speed.

28. The system of claim 27, wherein the controller is configured to operate in a closed loop mode to maintain clutch slip speed with inputs from at least one of a rotation per minute sensor and a pressure sensor.

29. The system of claim 27, wherein the controller is configured to operate in an open loop mode to maintain clutch slip speed and maintain a predetermined clutch pressure.

30. The system of claim 27, wherein the controller is configured to maintain the clutch slip speed below 30 rotations per minute.

31. The system of claim 29, wherein the predetermined clutch pressure is predetermined based at least in part on a resonant frequency of the drive line to dampen the torsional vibrations.

32. The system of claim 27, wherein the controller is further programmed to fully engage the clutch with substantially a zero slip speed before maintaining the clutch slip speed such that the continuous comparison of total torque and clutch slip speed produces a positively sloped function of total torque over clutch slip speed.

* * * * *